(12) United States Patent
Okubo et al.

(10) Patent No.: US 12,427,878 B2
(45) Date of Patent: Sep. 30, 2025

(54) ELECTRIC VEHICLE MANAGEMENT DEVICE AND ELECTRIC VEHICLE MANAGEMENT SYSTEM

(71) Applicant: TOYOTA JIDOSHA KABUSHIKI KAISHA, Toyota (JP)

(72) Inventors: Atsushi Okubo, Nisshin (JP); Kiyonori Yoshida, Toyota (JP); Kotomi Asano, Toyota (JP); Tamaki Ozawa, Toyota (JP); Yusuke Saigo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 407 days.

(21) Appl. No.: 18/086,772

(22) Filed: Dec. 22, 2022

(65) Prior Publication Data

US 2023/0264586 A1 Aug. 24, 2023

(30) Foreign Application Priority Data

Feb. 22, 2022 (JP) .................. 2022-025764

(51) Int. Cl.
| | |
|---|---|
| *G05B 15/02* | (2006.01) |
| *B60L 53/30* | (2019.01) |
| *B60L 53/60* | (2019.01) |
| *G06Q 30/0208* | (2023.01) |

(52) U.S. Cl.
CPC ............ *B60L 53/60* (2019.02); *B60L 53/305* (2019.02); *G05B 15/02* (2013.01); *G06Q 30/0208* (2013.01)

(58) Field of Classification Search
CPC ........ B60L 53/60; B60L 53/305; B60L 53/63; B60L 53/64; B60L 53/66; B60L 53/68; B60L 55/00; B60L 53/65; G05B 15/02; Y02T 10/70; Y02T 10/7072; Y02T 90/12; Y02T 90/16; G06Q 30/0208; G06Q 10/02; G06Q 10/0631; G06Q 30/0238; G06Q 50/06; G06Q 50/12; G06Q 50/40; H02J 3/322; H04L 67/12; H04L 67/55
See application file for complete search history.

(56) References Cited

U.S. PATENT DOCUMENTS

| | | | |
|---|---|---|---|
| 2009/0144150 A1 | 6/2009 | Sakakibara et al. | |
| 2009/0313104 A1* | 12/2009 | Hafner | G06Q 20/10 705/14.25 |
| 2010/0076825 A1* | 3/2010 | Sato | B60L 53/65 705/14.1 |

(Continued)

FOREIGN PATENT DOCUMENTS

| | | |
|---|---|---|
| JP | 2009-141991 A | 6/2009 |
| JP | 2019-082750 A | 5/2019 |

(Continued)

*Primary Examiner* — Santosh R Poudel
(74) *Attorney, Agent, or Firm* — Dinsmore & Shohl LLP

(57) ABSTRACT

A server (electric vehicle management device) includes a communication unit (second communication unit) that communicates with a DCM (first communication unit) of a user of an electric vehicle and a processor (control unit) that controls the communication unit. The processor controls the communication unit such that viewable content C is transmitted to the DCM of the user when a predetermined condition regarding electric power control at an EVSE (electric power station) is satisfied.

8 Claims, 5 Drawing Sheets

(56) References Cited

U.S. PATENT DOCUMENTS

| | | | |
|---|---|---|---|
| 2013/0096995 A1* | 4/2013 | Rosalik, Jr. | G06Q 50/06 |
| | | | 705/14.1 |
| 2015/0081059 A1* | 3/2015 | Hwang | G01C 22/006 |
| | | | 702/19 |
| 2019/0130449 A1 | 5/2019 | Kaisha | |
| 2020/0091752 A1* | 3/2020 | Esaka | B60L 55/00 |
| 2020/0198493 A1 | 6/2020 | Toyota et al. | |
| 2021/0158460 A1* | 5/2021 | Fang | G06Q 30/0207 |
| 2021/0331600 A1* | 10/2021 | Hishida | B60L 55/00 |
| 2021/0376402 A1 | 12/2021 | Tsuchiya | |

FOREIGN PATENT DOCUMENTS

| | | |
|---|---|---|
| JP | 2020-102025 A | 7/2020 |
| JP | 2021-191157 A | 12/2021 |

\* cited by examiner

ELECTRIC VEHICLE MANAGEMENT DEVICE AND ELECTRIC VEHICLE MANAGEMENT SYSTEM

CROSS-REFERENCE TO RELATED APPLICATION

This application claims priority to Japanese Patent Application No. 2022-025764 filed on Feb. 22, 2022, incorporated herein by reference in its entirety.

BACKGROUND

1. Technical Field

The present disclosure relates to an electric vehicle management device and an electric vehicle management system.

2. Description of Related Art

For example, the charging process system described in Japanese Unexamined Patent Application Publication No. 2020-102025 (JP 2020-102025 A) includes electric power supply equipment capable of supplying $CO_2$-free electric power generated using renewable energy, and a server. The server issues a coupon that can be used at a store in the vicinity of the electric power supply equipment, to a user of an electric vehicle that performs $CO_2$-free charging.

SUMMARY

In JP 2020-102025 A, as described above, the server issues a coupon that can be used at the store in the vicinity of the electric power supply equipment, to the user of the electric vehicle that performs $CO_2$-free charging. However, in the charging process system described in JP 2020-102025 A, a user who does not use a shop in the vicinity of the electric power supply equipment does not receive any benefits. Therefore, there is a demand for a server (electric vehicle management device) that provides a preferential service as a reward for electric power control such as charging, to a user who does not use a store in the vicinity of electric power supply equipment.

The present disclosure provides an electric vehicle management device and an electric vehicle management system capable of providing a user who does not use a shop in the vicinity of an electric power station with a preferential service as a reward for electric power control such as charging.

An electric vehicle management device according to a first aspect of the present disclosure manages an electric vehicle configured to perform electric power control including at least one of supplying electric power to an electric power system and charging from the electric power system, the electric vehicle management device including a second communication unit and a control unit. The second communication unit is configured to communicate with a first communication unit of a user of the electric vehicle. The control unit is configured to control the second communication unit. The control unit is configured to control the second communication unit such that viewable content is transmitted to the first communication unit of the user when a predetermined condition regarding the electric power control at an electric power station is satisfied.

In the first aspect, as described above, the control unit is configured to control the second communication unit such that the viewable content is transmitted to the first communication unit of the user when the predetermined condition regarding the electric power control at the electric power station is satisfied. As a result, the user can receive a preferential service of viewing content, which is different from a preferential service for shopping. Therefore, with the electric vehicle management device configured as described above, it is possible to provide a user who does not use a store in the vicinity of the electric power station with a preferential service as a reward for the electric power control such as charging.

In the first aspect, the content may include at least one of a video, music, and an online conversation. With this configuration, a user who does not plan to shop at the store can enjoy at least one of the video, the music, and the web conversation.

In the first aspect, the control unit may perform control for adjusting the content transmitted to the first communication unit based on the degree of contribution of the electric power control to an electric power supply-and-demand adjustment request from the electric power system. With this configuration, it is possible to easily increase the user's motivation for performing electric power control by appropriately adjusting the relationship between the degree of contribution of the electric power control and the content to be transmitted.

In the first aspect, the control unit may control the second communication unit such that the content is transmitted to the first communication unit mounted on the electric vehicle. With this configuration, even a user who does not have a portable communication device or the like can acquire the content by the first communication unit of the electric vehicle.

In the first aspect, the content may include at least one prepared piece of content selected by the user from among a plurality of prepared pieces of content prepared in advance. With this configuration, the user can select the content to be viewed. As a result, it is possible to increase the user's satisfaction with the transmitted content.

In the first aspect, the predetermined condition may include a condition that the user responds to the electric power supply-and-demand adjustment request from the electric power system and a condition that the electric vehicle is electrically connected to the electric power station. With this configuration, it is possible to reduce instances of the user from acquiring the content without electric power control. That is, it is possible to reduce instances of the content from being acquired by a malicious user.

An electric vehicle management system according to a second aspect of the present disclosure includes an electric power station, and an electric vehicle management device. The electric vehicle management device is configured to manage an electric vehicle configured to perform electric power control including at least one of supplying electric power to an electric power system and charging from the electric power system. The electric vehicle management device includes a second communication unit configured to communicate with a first communication unit of a user of the electric vehicle, and a control unit configured to control the second communication unit. The control unit is configured to control the second communication unit such that viewable content is transmitted to the first communication unit of the user when a predetermined condition regarding the electric power control at the electric power station is satisfied.

In the second aspect, as described above, the control unit is configured to control the second communication unit such that the viewable content is transmitted to the first communication unit of the user when the predetermined condition regarding the electric power control at the electric power station is satisfied. As a result, the user can receive a preferential service of viewing content, which is different from a preferential service for shopping. Therefore, it is possible to provide the electric vehicle management system which can provide a user who does not use a store in the vicinity of the electric power station with a preferential service as a reward for the electric power control such as charging.

With each aspect of the present disclosure, it is possible to provide a preferential service as a reward for electric power control such as charging, to a user who does not use a shop in the vicinity of an electric power station.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
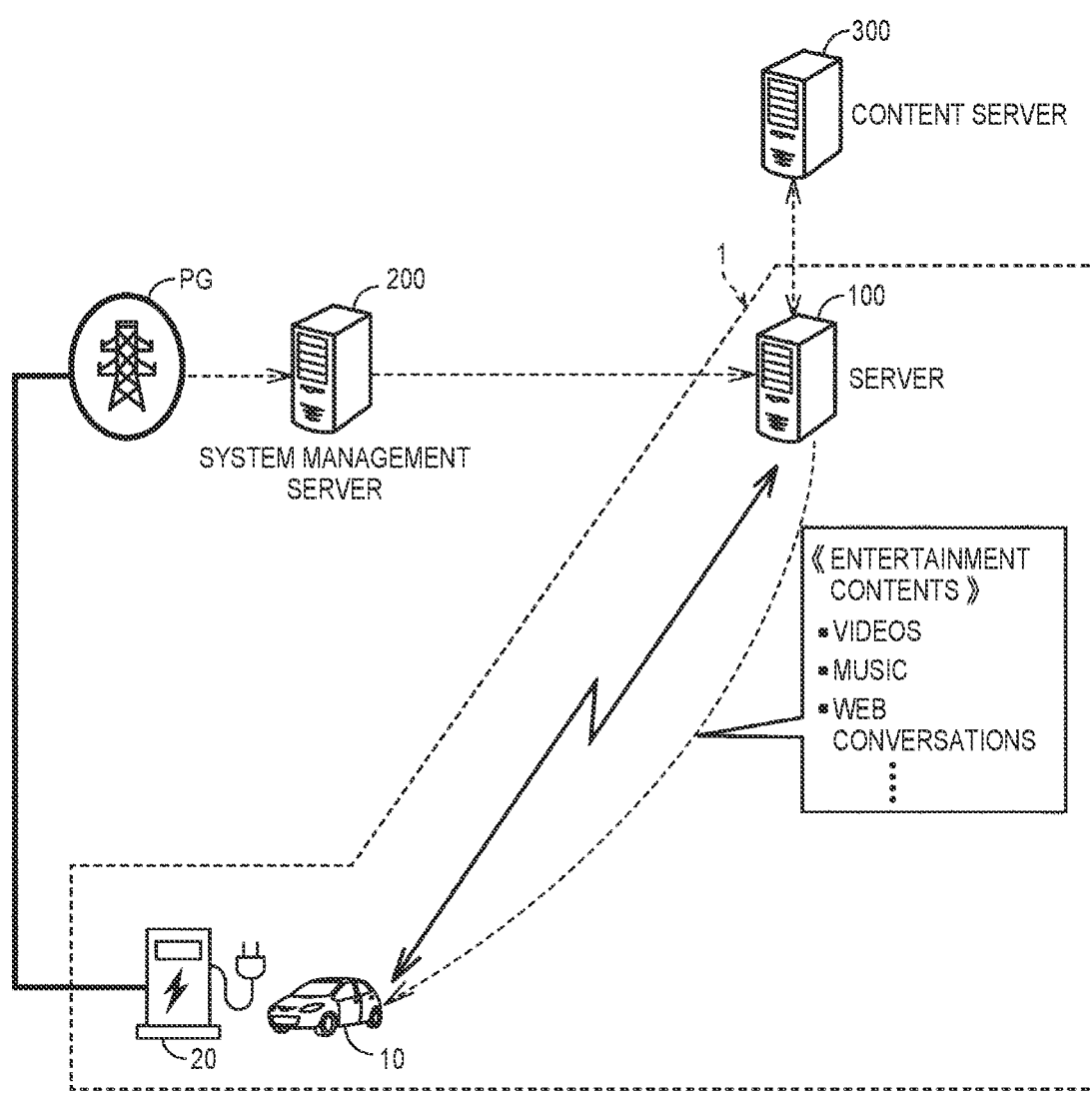
FIG. 1 is a view illustrating a management system that manages a server according to an embodiment and various servers that communicate with the server.

Hereinafter, an embodiment of the present disclosure will be described in detail with reference to the drawings. The same or corresponding parts in the drawings are denoted by the same reference numerals, and the description thereof will not be repeated.

FIG. 1 is a view illustrating schematic configurations of a management system 1 that manages a server 100 according to the embodiment of the present disclosure, a system management server 200, a content server 300, and an electric power system PG. The server 100 and the management system 1 are respectively examples of the "electric vehicle management device" and the "electric vehicle management system" of the present disclosure.

The management system 1 is a system that manages (includes) the server 100, an electric vehicle 10, and an electric vehicle supply equipment (EVSE) 20. The server 100 is configured to be communicable (wirelessly communicable) with each of the system management server 200, the content server 300, the electric vehicle 10, and a portable terminal 15 (see FIG. 2) described below. The EVSE 20 is an example of an "electric power station" in the present disclosure.

The electric power system PG is an electric power network constructed by electric power plants and electric power transmission/distribution equipment (not illustrated). In this embodiment, the electric power company serves as both an electric power generation business operator and an electric power transmission/distribution business operator. An electric power company corresponds to a general electric power transmission/distribution business operator, and maintains and manages the electric power system PG. The electric power company corresponds to the administrator of the electric power system PG.

The system management server 200 manages supply and demand of the electric power system PG (electric power grid). In addition, the system management server 200 belongs to the electric power company. The system management server 200 transmits to the server 100 a request (supply-and-demand adjustment request) for adjusting the electric power demand of the electric power grid PG based on the electric power generation and consumption by each electric power adjustment resource managed by the system management server 200. Specifically, the system management server 200 transmits to the server 100 a request to increase or decrease the electric power demand in relation to a normal level when the electric power generated or consumed by the electric power adjustment resource is expected to be higher than normal (or when larger at that moment).

The server 100 is a server managed by an aggregator. An aggregator is an electric power business operator that provides energy management services by bundling a plurality of electric power adjustment resources in region and in predetermined facilities.

As one technique for increasing or decreasing the electric power demand of the electric power system PG, the server 100 requests the electric vehicle 10 to perform control (hereinafter, simply referred to as "electric power control") including electric power supply (external electric power supply) to the electric power system PG, and charging (external charging) from the electric power system PG. The server 100 transmits a request signal for making the request to the electric vehicle 10 to the electric vehicle 10 or the portable terminal 15 (see FIG. 2) owned by the user of the electric vehicle 10 or the like.

In addition, the server 100 is configured to manage registered information (hereinafter also referred to as "vehicle information") on a plurality of electric vehicles 10, registered information (hereinafter also referred to as "user information") on each user, and registered information (hereinafter also referred to as "EVSE information") on the EVSE 20. The user information, the vehicle information, and the EVSE information are distinguished by identification information (ID) and stored in a memory 102 (see FIG. 2).

The user ID is identification information for identifying the user, and also functions as information (terminal ID) for identifying the portable terminal 15 (see FIG. 2) carried by the user. The server 100 is configured to distinguish and store the information received from the portable terminal 15 for each user ID. The user information includes a communication address of the portable terminal 15 carried by the user and the vehicle ID of the electric vehicle 10 belonging to the user.

The vehicle ID is identification information for identifying the electric vehicle 10. The vehicle ID may be a license plate or a vehicle identification number (VIN). The vehicle information includes an operation schedule of each electric vehicle 10.

An EVSE-ID is identification information for identifying the EVSE 20. The EVSE information includes the communication address of each EVSE 20 and the state of the electric vehicle 10 connected to each EVSE 20. The EVSE information also includes information (for example, a combination of EVSE-ID and vehicle ID) indicating a combination of the electric vehicle 10 and the EVSE 20 that are connected to each other.

Figure 2:
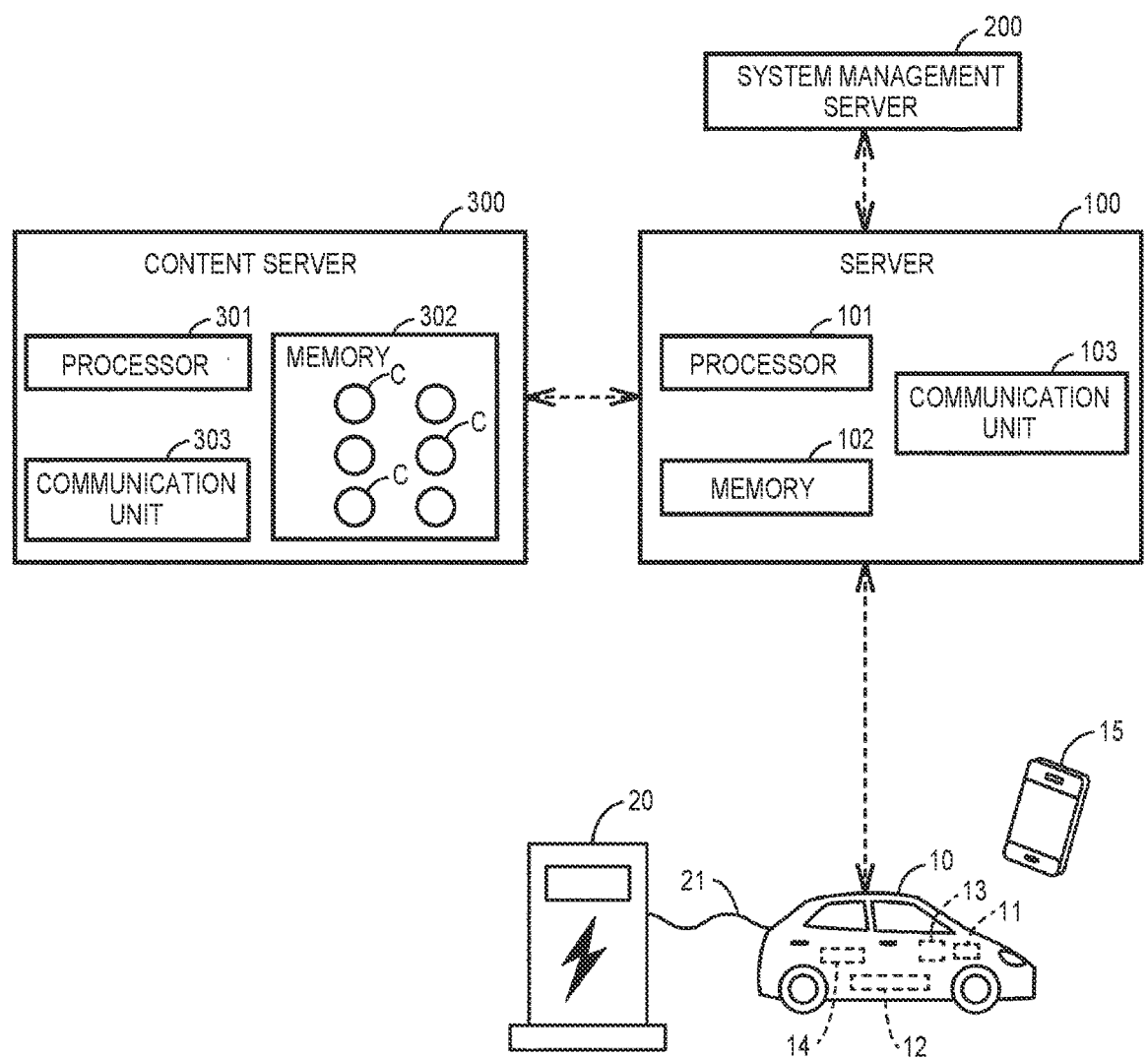
FIG. 2 is a view illustrating detailed configurations of the server according to the embodiment and an electric vehicle.

The content server 300 is a server that manages a plurality of pieces of content C such as movie and music. The pieces of content C are stored in the memory 302 (see FIG. 2) of the content server 300. Although the pieces of content C illustrated in FIG. 2 are given the same reference letters, they are different types of content. In addition, in FIG. 2, the content C is schematically illustrated for the sake of clarity. In addition, the content C stored in the memory 302 is an example of the "preparation content" of the present disclosure. Further, the content C transmitted to the user as described below is an example of the "content" of the present disclosure.

The electric vehicle 10 is configured to be capable of electric power control including external electric power supply and external charging. The electric power control is performed via the EVSE 20 between the electric vehicle 10 and the electric power system PG. The electric vehicle 10 includes, for example, a plug-in hybrid electric vehicle (PHEV), a battery electric vehicle (BEV), and a fuel cell electric vehicle (FCEV). In addition, the electric vehicle 10 may include at least one of a vehicle (personally owned vehicle (POV)) owned by an individual and a vehicle (MaaS vehicle) managed by a mobility-as-a-service (MaaS) business operator. The electric vehicle 10 may be configured to be capable of only one of external electric power supply and external charging.

The electric vehicle 10 includes a travel motor 11 (see FIG. 2) and a battery 12 (see FIG. 2) that supplies electric power to the travel motor 11. The battery 12 includes a secondary battery that stores electric power for traveling. A secondary battery is an assembled battery containing a plurality of lithium ion batteries or a plurality of nickel metal hydride batteries. Instead of the secondary battery, another electric power storage device such as an electric double layer capacitor may be employed.

In addition, the electric vehicle 10 is equipped with a data communication module (DCM) 13 (see FIG. 2). The DCM 13 is configured to be communicable with the server 100. The DCM 13 may be configured to be communicable with the content server 300. In addition, the electric vehicle 10 may include a communication I/F compatible with 5G (fifth generation mobile communication system). Further, the DCM 13 is an example of the "first communication unit" of the present disclosure.

The EVSE 20 means an electric power supply facility for vehicles. The electric vehicle 10 is configured to be electrically connectable to the EVSE 20. For example, by connecting a charging cable 21 (see FIG. 2) leading to the EVSE 20 to an inlet of the electric vehicle 10, it becomes possible to transfer electric power between the EVSE 20 and the electric vehicle 10. The number of EVSEs 20 managed by the management system 1 is arbitrary, and may be about 5, 10 or more, or 100 or more.

The EVSE 20 includes a DC-system EVSE. Therefore, direct current electric power is supplied from the electric vehicle 10 to the EVSE 20, and an inverter incorporated in the EVSE 20 performs DC/AC conversion. A charger/discharger 14 (see FIG. 2) that adjusts the charging/discharging electric power of the battery 12 of the electric vehicle 10 is configured to adjust the charging/discharging electric power by, for example, a DC/DC converter. However, in some embodiments, the EVSE 20 may not be of the DC system, and may be of the AC system.

As illustrated in FIG. 2, the server 100 includes a processor 101, the memory 102, and a communication unit 103. The processor 101 and the communication unit 103 are respectively examples of the "control unit" and the "second communication unit" of the present disclosure.

The memory 102 stores programs executed by the processor 101 as well as information (for example, maps, formulas, and various parameters) used in the programs. The communication unit 103 includes various communication I/Fs. The processor 101 controls the communication unit 103. Specifically, the processor 101 communicates with the outside (system management server 200, content server 300, DCM 13, and portable terminal 15) through the communication unit 103.

The content server 300 includes a processor 301, the memory 302, and a communication unit 303. The communication unit 303 is configured to be able to communicate with the communication unit 103 of the server 100. The memory 302 stores programs executed by the processor 301 as well as information (for example, maps, formulas, and various parameters) used in the programs. The communication unit 303 includes various communication I/Fs.

An electric power management system that provides a user of the electric vehicle 10 that performed electric power control with a preferential service that can be used at a store located in the vicinity of the EVSE 20 is well-known. However, in this charging process system, there is no benefit for users who do not use stores in the vicinity of the EVSE 20. Therefore, it is desirable to provide users who do not use stores in the vicinity of the EVSE 20 with preferential services as rewards for electric power control such as charging.

Therefore, in the present embodiment, the processor 101 controls the communication unit 103 such that the viewable content C is transmitted to the DCM 13 of the user when a predetermined condition regarding electric power control at the EVSE 20 is satisfied. That is, the communication unit 103 transmits the content C to the DCM 13 based on the control (command) by the processor 101.

Specifically, the processor 101 causes the communication unit 103 to acquire the content C from the memory 302 of the content server 300. The processor 101 then causes the communication unit 103 to transmit the acquired content C to the DCM 13.

The processor 101 may cause the communication unit 303 of the content server 300 to transmit the content C to the DCM 13. That is, the communication unit 303 may transmit the content C directly to the DCM 13.

The processor 101 may control the communication unit 103 such that the content C is transmitted to the portable terminal 15 of the user.

Moreover, the predetermined conditions include a condition that the electric vehicle 10 was electrically connected to the EVSE 20 while the user responded to (indicating participation in electric power control) the electric power supply-and-demand adjustment request from the electric power system PG. That is, the user cannot acquire the content C unless the electric vehicle 10 is electrically connected to the EVSE 20 while responding to the electric power supply-and-demand adjustment request. Further, the user cannot acquire the content C even when the electric vehicle 10 is electrically connected to the EVSE 20 without responding to the electric power supply-and-demand adjustment request.

The content C may be transmitted to the user on condition that the electric power control has been performed for a predetermined time or longer (for example, fifteen minutes or longer) (or the user has set the electric power control to be performed for a predetermined time or longer). In addition, when the electric vehicle 10 is electrically connected to the EVSE 20, the content C may be transmitted to the user even when the user does not respond to the electric power supply-and-demand adjustment request.

When the user responds to the electric power supply-and-demand adjustment request, the content C may be transmitted to the user before the electric vehicle 10 is electrically connected to the EVSE 20. In this case, the transmitted content C may become viewable based on the electric vehicle 10 being electrically connected to the EVSE 20.

A predetermined penalty may be imposed in the next electric power control on the user who did not perform the electric power control even though the content C was acquired. For example, it may be controlled such that the content C is not provided even when the user performs electric power control.

In addition, the content C includes videos, music, and online conversations. The videos include various image-related content such as movies, dramas, and animations. The music includes a broad range of audio content, including popular songs, classical music, comic stories, comic dialogues, and the like. The online conversation includes, for example, educational content that enables an online conversation with a foreign language instructor. The content C may include content (for example, games and applications) other than videos, music, and web conversations.

The processor 101 performs control to adjust the content C transmitted to the DCM 13 based on the degree of contribution of the electric power control to the electric power supply-and-demand adjustment request from the electric power system PG. For example, when the degree of contribution is large, the processor 101 performs control to increase the number (types) of content C to be transmitted to the DCM 13. In addition, the processor 101 may perform control to lengthen the viewable period of the content C transmitted to the DCM 13 when the degree of contribution is large. As for the online conversation, the processor 101 may be able to select a conversation with a native foreign instructor when the degree of contribution is large.

The processor 101 calculates the degree of contribution based on, for example, the content (charging/discharging time, charging/discharging amount) contracted between the electric vehicle 10 and the server 100. The processor 101 may also calculate the degree of contribution based on the content of the contract and the content (charging/discharging time, charging/discharging amount) of the electric power control executed by the electric vehicle 10. The processor 101 may also calculate the degree of contribution based on the amount of change in the SOC of the electric vehicle 10 due to external charging (electric power supply), the absolute amount of electric power exchanged, and the like.

The content C is transmitted to the DCM 13 while the electric vehicle 10 is performing electric power control (while the electric vehicle 10 and the EVSE 20 are electrically connected). Further, the content C may also be transmitted to the DCM 13 after the electric power control ends.

In addition, the content C transmitted to the DCM 13 of the user includes at least one piece of content C selected by the user from among a plurality of pieces of content C prepared in advance in the memory 302 of the content server 300. In other words, the user can select a random piece of content C from the pieces of content C prepared in the memory 302 in advance. The processor 101 acquires the content C selected by the user from the memory 302 and transmits the acquired content C to the DCM 13.

Figure 4:
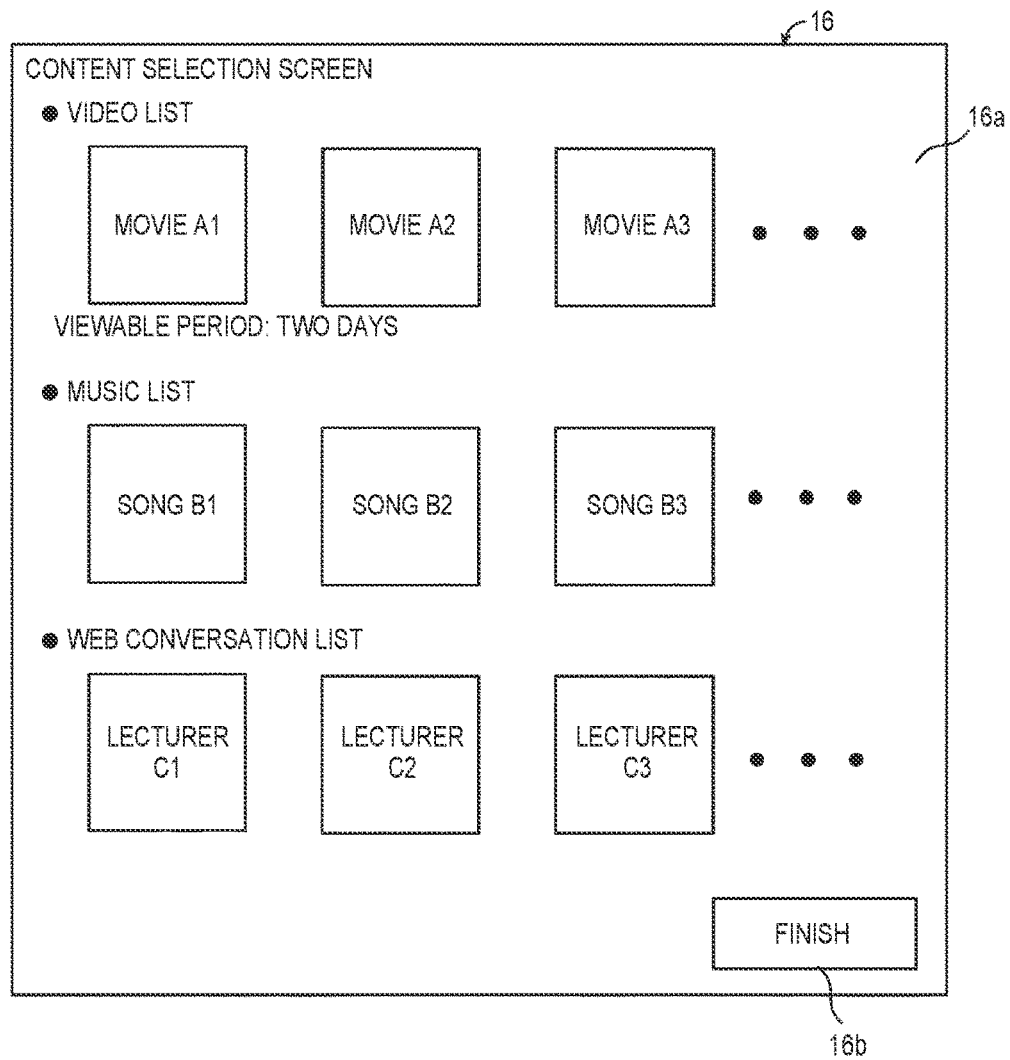
FIG. 4 is a view illustrating an example of a selection screen for content requested to be viewed.

Here, as illustrated in FIG. 4, the processor 101 may display a selection screen 16*a* for the content C on a display screen 16 of the car navigation of the electric vehicle 10 or the like. A list of the content C stored in the content server 300, for example, is displayed on the selection screen 16*a*. Thumbnails of the content C, for example, are displayed on the selection screen 16*a*. The content C selected by the user on the selection screen 16*a* can be viewed on the display screen 16. The type (number) of selectable content C is determined based on the degree of contribution. A viewable period determined based on the degree of contribution may be displayed near the thumbnail of each piece of content C (see the bottom of movie A1 in FIG. 4). In addition, the selection screen 16*a* illustrated in FIG. 4 is an example, and is not limited to this.

The processor 101 randomly selects the content C to be transmitted to the user when there is no request for selection of the content C by the user. The type (number) of content C selected by the processor 101, the viewable period, and the like are determined based on the degree of contribution.

Electric Vehicle Management Method

Figure 3:
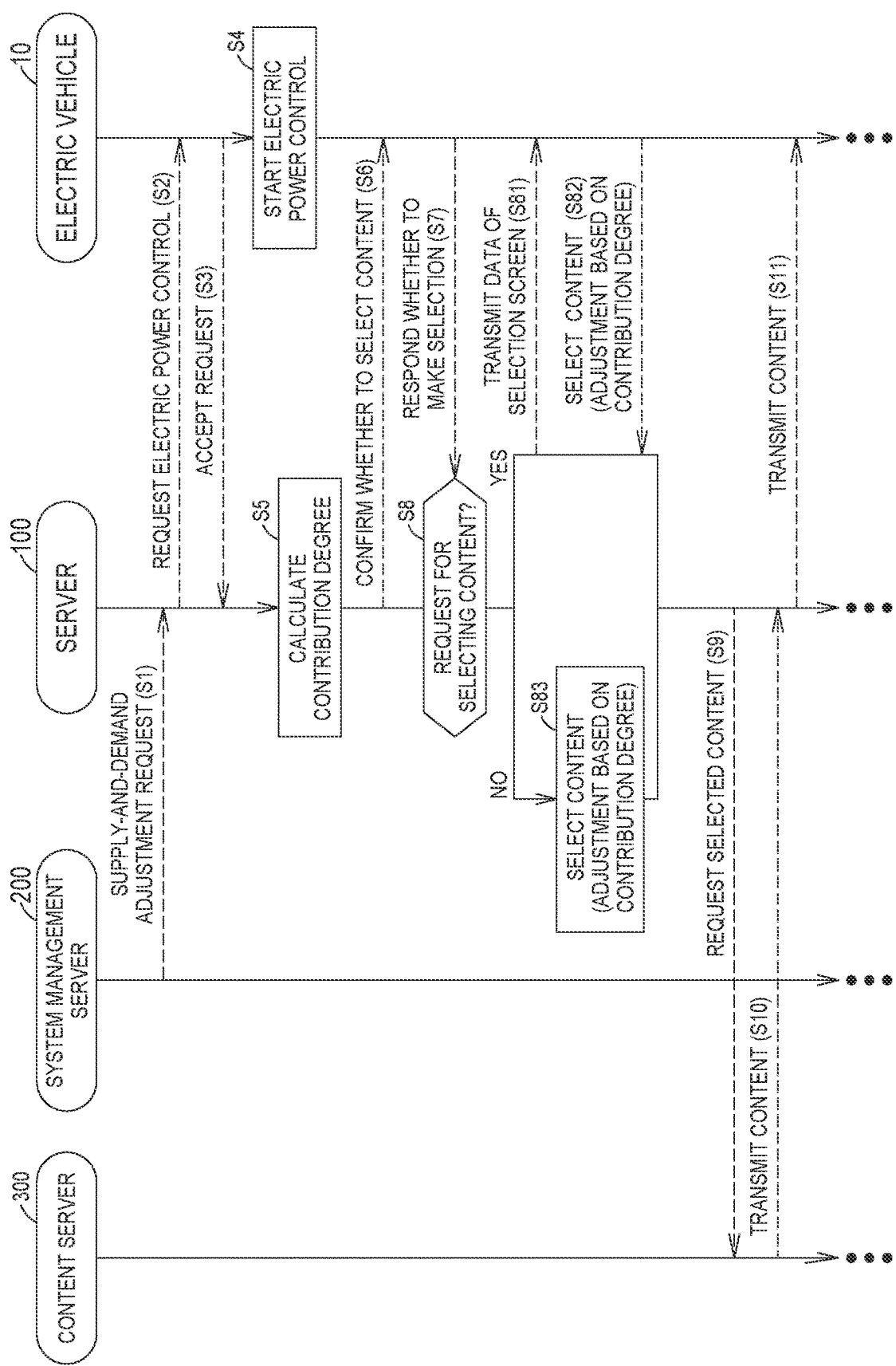
FIG. 3 is a sequence diagram illustrating control of the server or the like according to the embodiment.

Next, a method of managing the electric vehicle 10 by the server 100 will be described with reference to the sequence diagram of FIG. 3.

First, in step S1, the server 100 (communication unit 103) receives an electric power supply-and-demand adjustment request from the system management server 200. The system management server 200 transmits the supply-and-demand adjustment request to the server 100 based on the electric power generation and consumption by each electric power adjustment resource managed by the system management server 200 as described above.

Next, in step S2, the server 100 (processor 101) requests electric power control (external charging or external electric power supply) from the user of the electric vehicle 10 based on the supply-and-demand adjustment request received in step S1. In addition, the server 100 may transmit the inquiry signal for requesting electric power control directly to the electric vehicle 10 or to the portable terminal 15 of the user of the electric vehicle 10.

Next, in step S3, the user (electric vehicle 10) transmits to the server 100 an acceptance (participation in electric power control) in response to the electric power control request in step S2.

Next, in step S4, the electric vehicle 10 is electrically connected to the EVSE 20, thereby starting electric power control corresponding to the electric power control request in step S2.

Next, in step S5, the server 100 (processor 101) calculates the user's contribution degree to the electric power control. For example, the processor 101 calculates the degree of contribution based on the content (charging/discharging time, charging/discharging amount) contracted between the electric vehicle 10 and the server 100 in steps S2 and S3. Further, the degree of contribution may be calculated based on an integrated value (the number of times electric power control has been performed so far, the integrated value of the amount of charging (discharging) so far, and the like) of electric power control by the user. The calculation of the degree of contribution in step S5 may be performed between steps S3 and S4.

Figure 5:
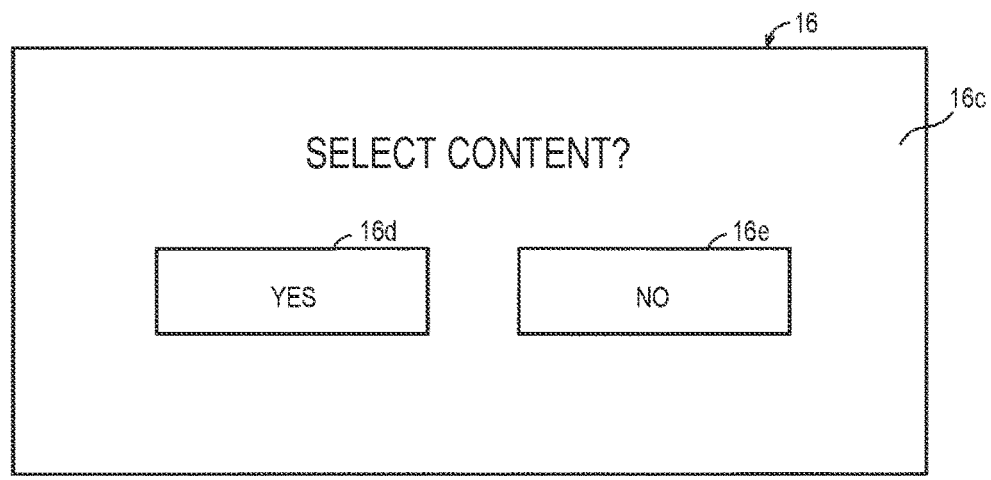
FIG. 5 is a view illustrating an example of a message screen for confirming whether to request selection of content.

Next, in step S6, the server 100 (processor 101) confirms with the user (electric vehicle 10) whether to select a piece of content C to be viewed. For example, the server 100 (processor 101) may control the communication unit 103 such that the display screen 16 (or portable terminal 15) of the electric vehicle 10 displays a message screen 16*c* (see FIG. 5) for confirming whether to select the content C to be viewed.

A button 16d with "YES" and a button 16e with "NO" are displayed on the message screen 16c. By selecting the button 16d with "YES", information is transmitted to the server 100 to request selection of the content C. By selecting the button 16e with "NO", information is transmitted to the server 100 indicating that selection of the content C is not requested. The process of step S6 may be performed before the process of step S5.

Next, in step S7, it is assumed that the user (electric vehicle 10) responds to the confirmation in step S6. That is, it is assumed that either the button 16d with "YES" or the button 16e with "NO" on the message screen 16c is selected.

Next, in step S8, the server 100 (processor 101) determines whether there is a request for selecting the content C from the user. When the user requests selection of the content C in step S7 (that is, when the button 16d with "YES" is selected), the server 100 (processor 101) determines that there is the selection request, and the process proceeds to step S81 (Yes in S8). On the other hand, when the user does not request selection of the content C in step S7 (that is, when the button 16e with "NO" is selected), the server 100 (processor 101) determines that there is no selection request, and the process proceeds to step S83 (No in S8).

In step S81, the server 100 (processor 101) controls the communication unit 103 such that the data of the selection screen 16a (see FIG. 4) of the content C is transmitted to the DCM 13 of the electric vehicle 10. Specifically, the communication unit 103 acquires the data of the selection screen 16a from the content server 300 under the control of the processor 101 and transmits the acquired data of the selection screen 16a to the DCM 13. The processor 101 may control the content server 300 such that the data of the selection screen 16a is directly transmitted from the content server 300 to the DCM 13. As a result, the selection screen 16a is displayed on the display screen 16 of the electric vehicle 10 (see FIG. 4).

In this case, the type (number) of content C selectable on the selection screen 16a, the viewable period, and the like may be adjusted (restricted) based on the degree of contribution calculated in step S5.

Next, in step S82, the user (electric vehicle 10) selects at least one of the pieces of content C displayed on the selection screen 16a. For example, when at least one piece of content C displayed on the selection screen 16a is selected, and a button 16b with "Finish" is selected on the selection screen 16a, information on the content C selected by the user may be transmitted to the server 100.

On the other hand, in step S83, the server 100 (processor 101) randomly selects at least one of the pieces of content C stored in the memory 302 of the content server 300. In this case, the server 100 (processor 101) adjusts the type (number) of the content C to be selected, the viewable period, and the like based on the degree of contribution. The processor 101 may select the content C by referring to the user's past viewing history of the content C, or the like.

Next, in step S9, the server 100 (processor 101) controls the communication unit 103 such that a signal requesting the content C selected in step S82 or step S83 is transmitted to the content server 300.

Next, in step S10, the content server 300 transmits the selected content C to the server 100 (communication unit 103) based on the request signal received in step S9. The server 100 may issue a command to the content server 300 such that the content server 300 transmits the content C directly to the user.

Figure 6:
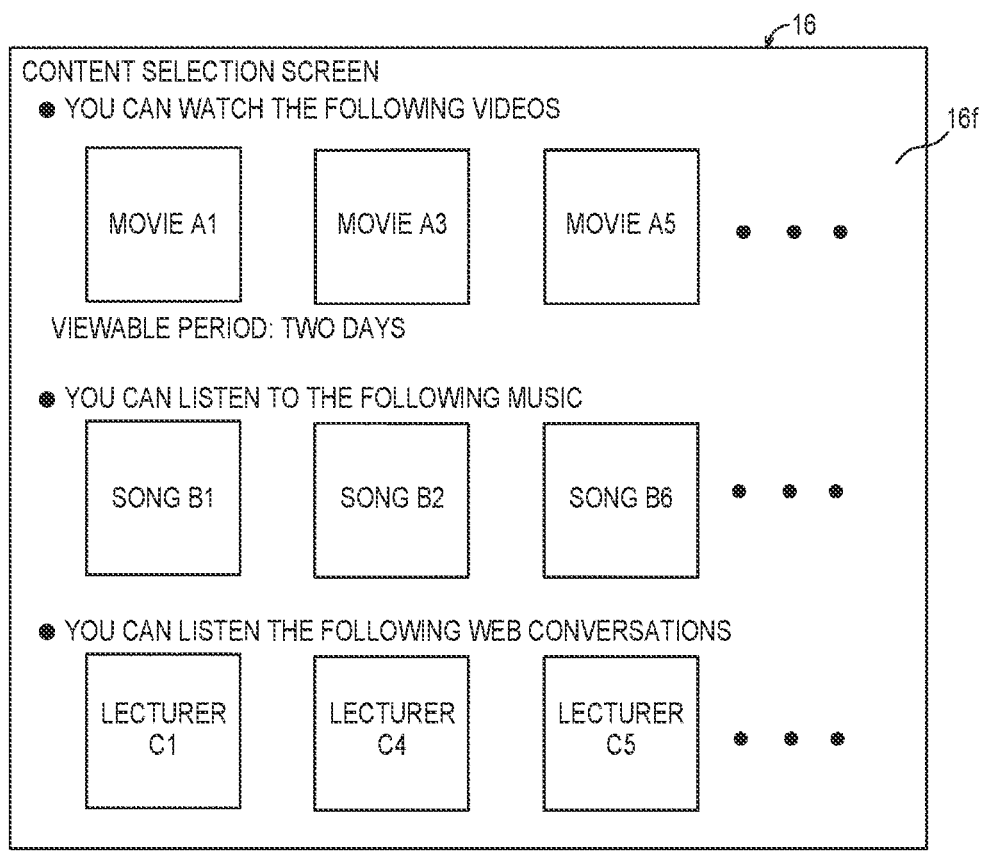
FIG. 6 is a view illustrating an example of a selection screen for content that has become viewable.

Then, in step S11, the server 100 (processor 101) controls the communication unit 103 such that the content C received in step S10 is transmitted to the DCM 13 of the electric vehicle 10. As a result, a selection screen 16f (see FIG. 6) is displayed on the display screen 16 of the electric vehicle 10. The selection screen 16f displays, for example, a list of the pieces of content C that have become viewable. When the content C is selected by the user on the selection screen 16f, the selected content C is started.

The server 100 (processor 101) may terminate transmission of the content C based on termination (electrical connection between the electric vehicle 10 and the EVSE 20 is terminated) of electric power control by the user.

As described above, in the present embodiment, the processor 101 controls the communication unit 103 of the server 100 such that the viewable content C is transmitted to the DCM 13 of the user when a predetermined condition regarding electric power control at the EVSE 20 is satisfied. Thereby, the content C can be enjoyed in the electric vehicle 10 while electric power control such as external charging is being performed. As a result, the user's motivation for electric power control can be increased.

Further, in the above-described embodiment, an example in which the number (type) of pieces of content C to be transmitted, or the like, is adjusted based on the degree of contribution to electric power control is described, but the present disclosure is not limited to this. The number (type) of pieces of content C to be transmitted may be fixed (uniform) regardless of the degree of contribution.

In addition, in the above-described embodiment, an example in which the server 100 and the content server 300 are separately provided is shown, but the present disclosure is not limited to this. The content C may be stored in the server 100.

Further, in the above-described embodiment, an example is shown in which the server 100 (processor 101) confirms with the user whether to select the content C, but the present disclosure is not limited to this. The server 100 (processor 101) may be configured to either transmit the content C selected by the user to the DCM 13 or transmit select the content C the server 100 randomly selects to the DCM 13 without confirmation.

The embodiment disclosed herein should be considered as an example and not restrictive in all respects. The scope of the present disclosure is indicated by the scope of the claims rather than the description of the above-described embodiment, and is intended to include all modifications within the scope and meaning equivalent to the scope of the claims.

What is claimed is:

1. An electric vehicle management device that manages an electric vehicle configured to perform electric power control including at least one of supplying electric power to an electric power system and charging from the electric power system, the electric vehicle management device comprising:

a server that includes:
a second communication unit configured to communicate with a first communication unit of a user of the electric vehicle, the first communication unit comprising a data communication module of the electric vehicle; and
a processor
configured to:
control the second communication unit such that viewable content is transmitted to the first communication unit of the user on condition that the electric power control has been performed for a time equal to or greater than a predetermined amount of time that is set by the user and when a predetermined condition regarding the electric power control at an electric power station is satisfied; and adjust a length of a viewable period of the content based on a degree of contribution of the electric power control reaching a predetermined value, the degree of contribution being determined based on a charging/discharging time, a charging/discharging amount, a state of charge of the electric vehicle due to external charging, and an absolute amount of the electric power exchanged.

2. The electric vehicle management device according to claim 1, wherein the content includes at least one of a video, music, and an online conversation.

3. The electric vehicle management device according to claim 1, wherein the processor is configured to perform control for adjusting the content transmitted to the first communication unit based on the degree of contribution of the electric power control to an electric power supply-and-demand adjustment request from the electric power system.

4. The electric vehicle management device according to claim 1, wherein the processor is configured to control the second communication unit such that the content is transmitted to the first communication unit mounted on the electric vehicle.

5. The electric vehicle management device according to claim 1, wherein the content includes at least one prepared piece of content selected by the user from among a plurality of prepared pieces of content prepared in advance.

6. The electric vehicle management device according to claim 1, wherein the predetermined condition includes a condition that the user responds to an electric power supply-and-demand adjustment request from the electric power system and a condition that the electric vehicle is electrically connected to the electric power station.

7. The electric vehicle management device according to claim 1, wherein the processor is configured to manage registered information on a plurality of vehicles, registered information on a plurality of users of each of the plurality of vehicles, and registered information on the electric vehicle supply equipment, and that are each distinguished by respective identification information stored in a memory.

8. An electric vehicle management system comprising:
an electric power station; and
an electric vehicle management device configured to manage an electric vehicle configured to perform electric power control including at least one of supplying electric power to an electric power system and charging from the electric power system, wherein:
the electric vehicle management device includes a server that includes a second communication unit configured to communicate with a first communication unit of a user of the electric vehicle, and a processor, the first communication unit comprising a data communication module of the electric vehicle; and
the processor is configured to control the second communication unit such that viewable content is transmitted to the first communication unit of the user on condition that the electric power control has been performed for a time equal to or greater than a predetermined amount of time that is set by the user and when a predetermined condition regarding the electric power control at the electric power station is satisfied; and
adjust a length of a viewable period of the content based on a degree of contribution of the electric power control reaching a predetermined value, the degree of contribution being determined based on a charging/discharging time, a charging/discharging amount, a state of charge of the electric vehicle due to external charging, and an absolute amount of the electric power exchanged.

* * * * *